May 19, 1964  J. GRUNFELDER  3,133,715
APPARATUS FOR SUPPORTING AND HOLDING FOLDABLE
ROTOR BLADES OF HELICOPTERS
Filed Dec. 14, 1962  7 Sheets-Sheet 6
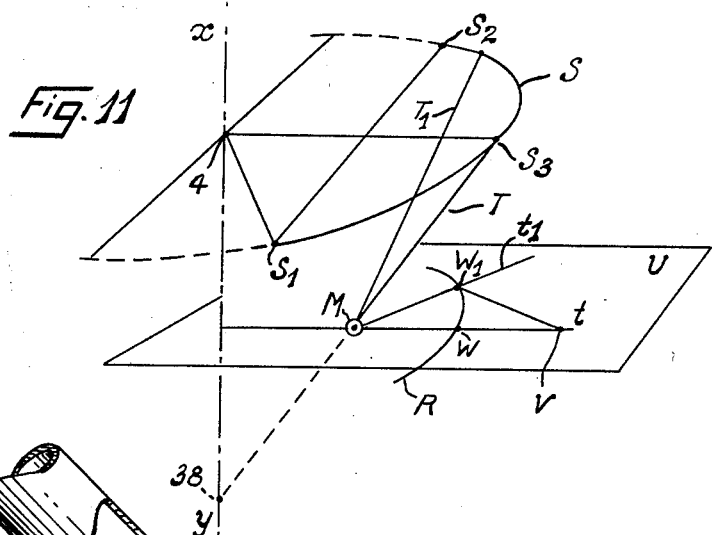
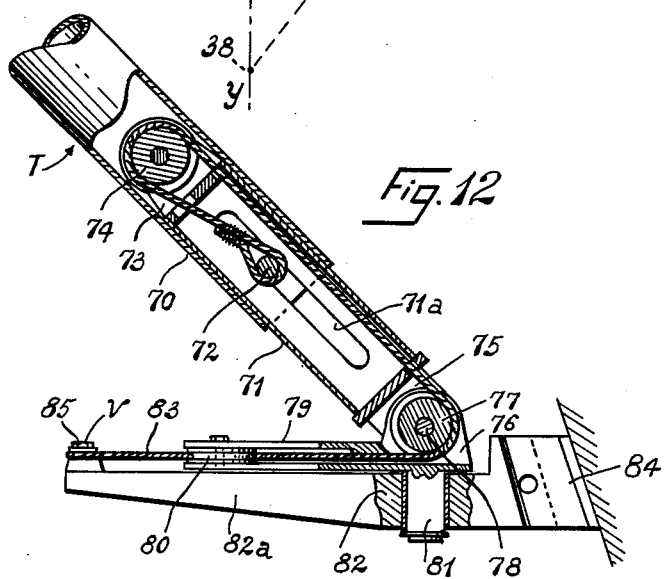
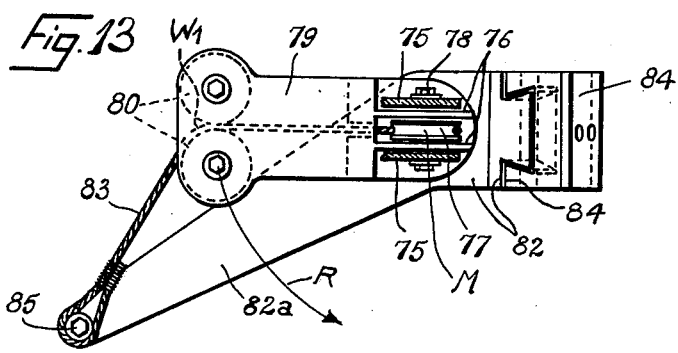

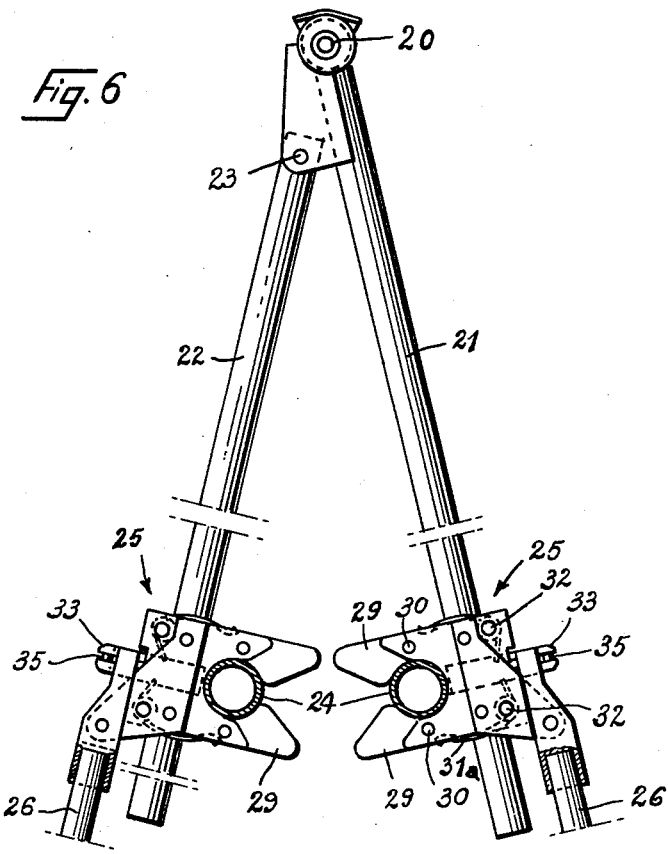
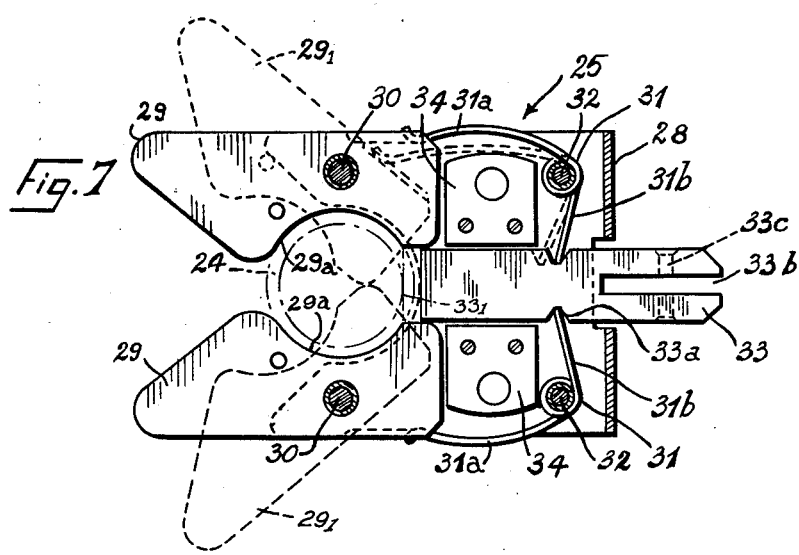

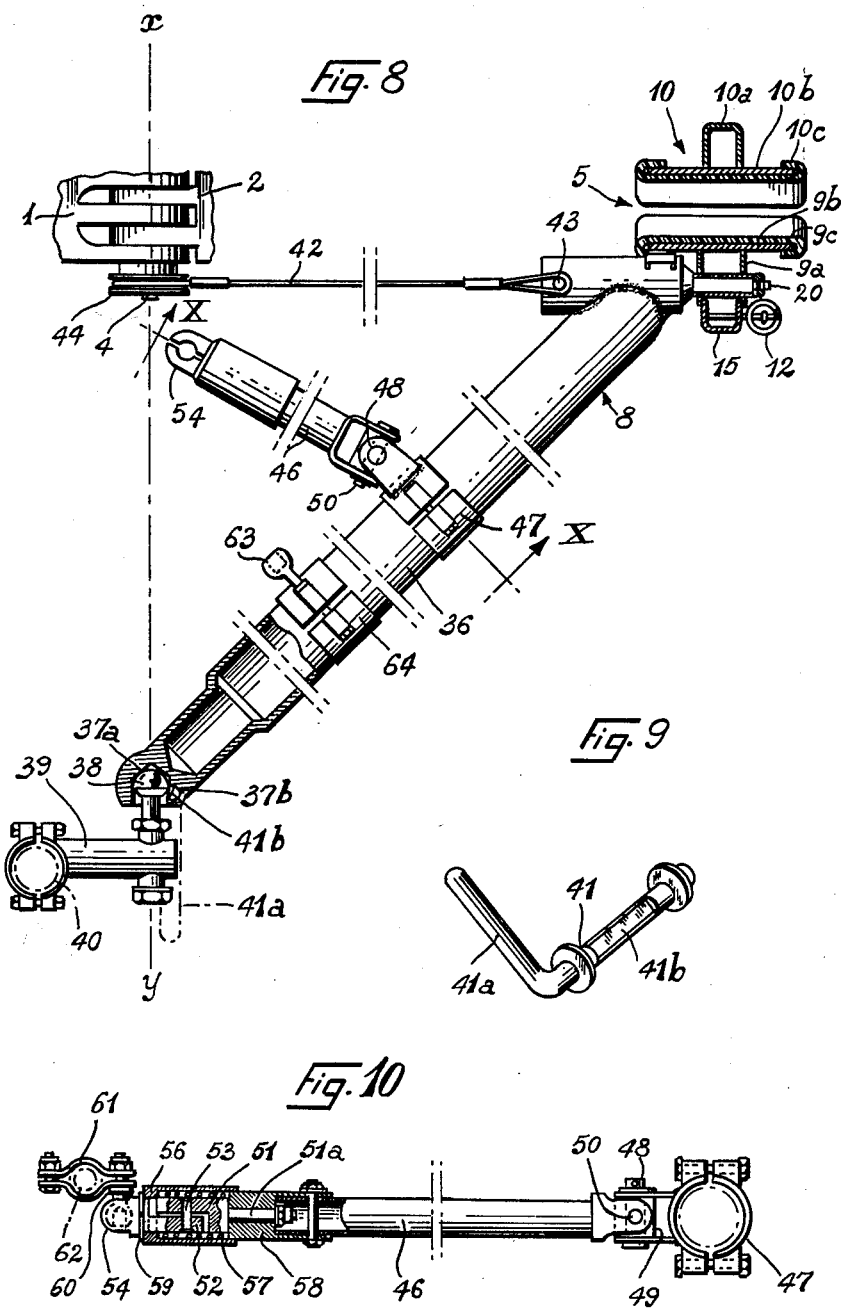

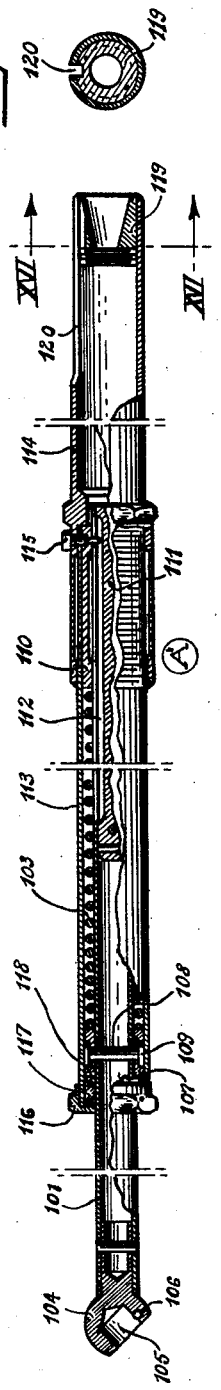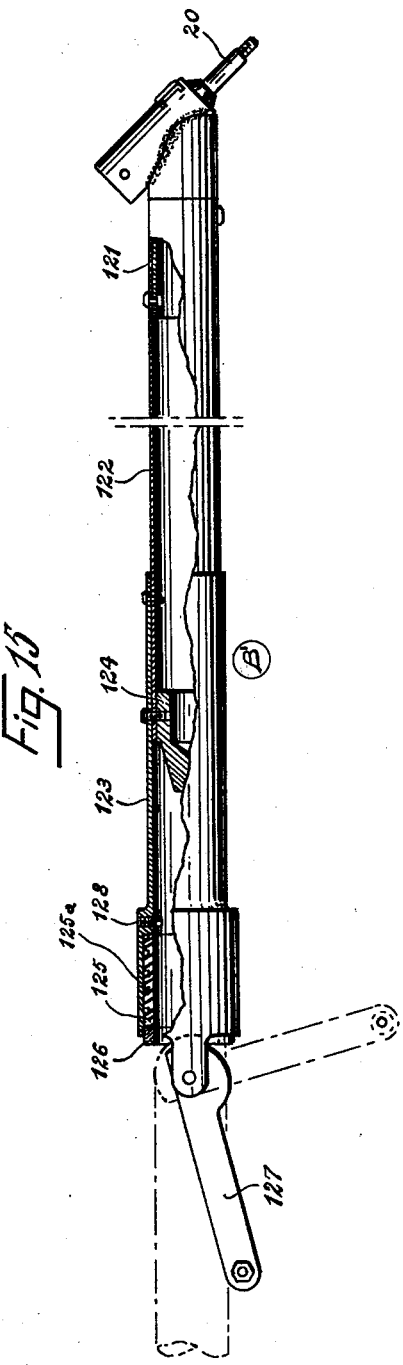

United States Patent Office 3,133,715
Patented May 19, 1964

3,133,715
APPARATUS FOR SUPPORTING AND HOLDING FOLDABLE ROTOR BLADES OF HELICOPTERS
Jean Grunfelder, Paris, France, assignor to Sud-Aviation, Societe Nationale de Constructions Aeronautiques, Paris, France, a company of France
Filed Dec. 14, 1962, Ser. No. 244,816
Claims priority, application France Dec. 22, 1961
15 Claims. (Cl. 244—17.11)

When using helicopters for military purposes, either on board ships or from concealed sites on the ground, it is desirable to be able to fold the rotor blades in order to reduce the bulk of the machine, and therefore such blades have to be unfolded before any operational use.

Although it is possible to tolerate some delay in folding, it is of prime importance that the machine should be capable of coming into action quickly and the time necessary for this unfolding operation must be reduced to the minimum.

Apparatus have been designed, both of hydraulic and electrical types, for carrying out this unfolding operation automatically, but their complexity and their weight prevent them from being applied to light helicopters.

The present invention can be used in light helicopters, comprising, for example, three rotor blades, where it is desired to limit to a minimum amount the increase in the empty weight of the machine to the apparatus for folding the blades and holding them folded. Furthermore, the lightness of the blades makes it possible for this apparatus to be operated by hand.

The apparatus for supporting and holding blades according to the invention is composed of as many blade-carrying clips as there are blades, each clip comprising a lower jaw engaged below the blade and an upper jaw pressing this blade against the lower jaw, and being carried by a support bearing against the fuselage in order to transmit thereto the weight of the said blade, the said supports except for one at the most being adapted to pivot about their point of attachment to the fuselage, whereas the blade itself pivots about an articulation at which it is connected to the hub.

When there is an uneven number of blades, more especially three, one of them is directed in the plane of symmetry of the fuselage and is supported without folding by the fuselage whilst the other blades, articulated on the blade roots, are folded back on either side of this fuselage owing to the supports carrying the clips which pivot at their base on the said fuselage.

In order to permit rapid deployment of the blades, each clip is urged in the opening sense by a resilient device and is held closed by a locking device which can be released by a pull member.

Furthermore, the connection between the clip supports and the fuselage is constituted by a hook-on device permitting the rapid separation of these supports from the said fuselage.

The invention is applicable to various types of folding blades, more particularly those which are fixed on the hub arms by two pins, one of the pins being removed in order to enable the other to serve as a hinge pin.

Preferably in the case of the blades which are folded along the fuselage, the clip support pivots on an articulation which, carried by the fuselage, is situated in alignment with the geometric axis of the folding hinge of the blade.

When the arrangement of the fuselage does not permit the positioning of an articulation cited in this way, the positioning of the articulation is chosen to be as near as possible to the theoretical position and the length of the support between the clip and the articulation is rendered variable.

The invention is illustrated by way of example in the accompanying drawings, in which:

FIGURE 6 is an elevational view of the support of the non-folded blade of the helicopter;

FIGURE 7 is a vertical sectional view in the closed position, of a device for hooking to the helicopter fuselage the support represented in FIGURE 6;

FIGURE 8 is an elevation view of a folding support also showing a sectional view of the clip illustrated in FIGURE 5;

FIGURE 9 is a perspective view of a locking pin.

FIGURE 10 is a sectional view taken on X—X of FIGURE 8;

FIGURE 11 is a geometric view which is intended to show the advantages of the device shown in FIGURES 12 and 13 which illustrate respectively in elevation and in plan view an extensible folding support;

FIGURE 14 is a view, partly in section and partly in elevation, of a portion of a blade support whose length is resiliently variable;

FIGURE 15 shows the support part complementary to that which is illustrated in FIGURE 14, and FIGURE 16 is a sectional view on XVI—XVI of FIGURE 14.

Figure 1:
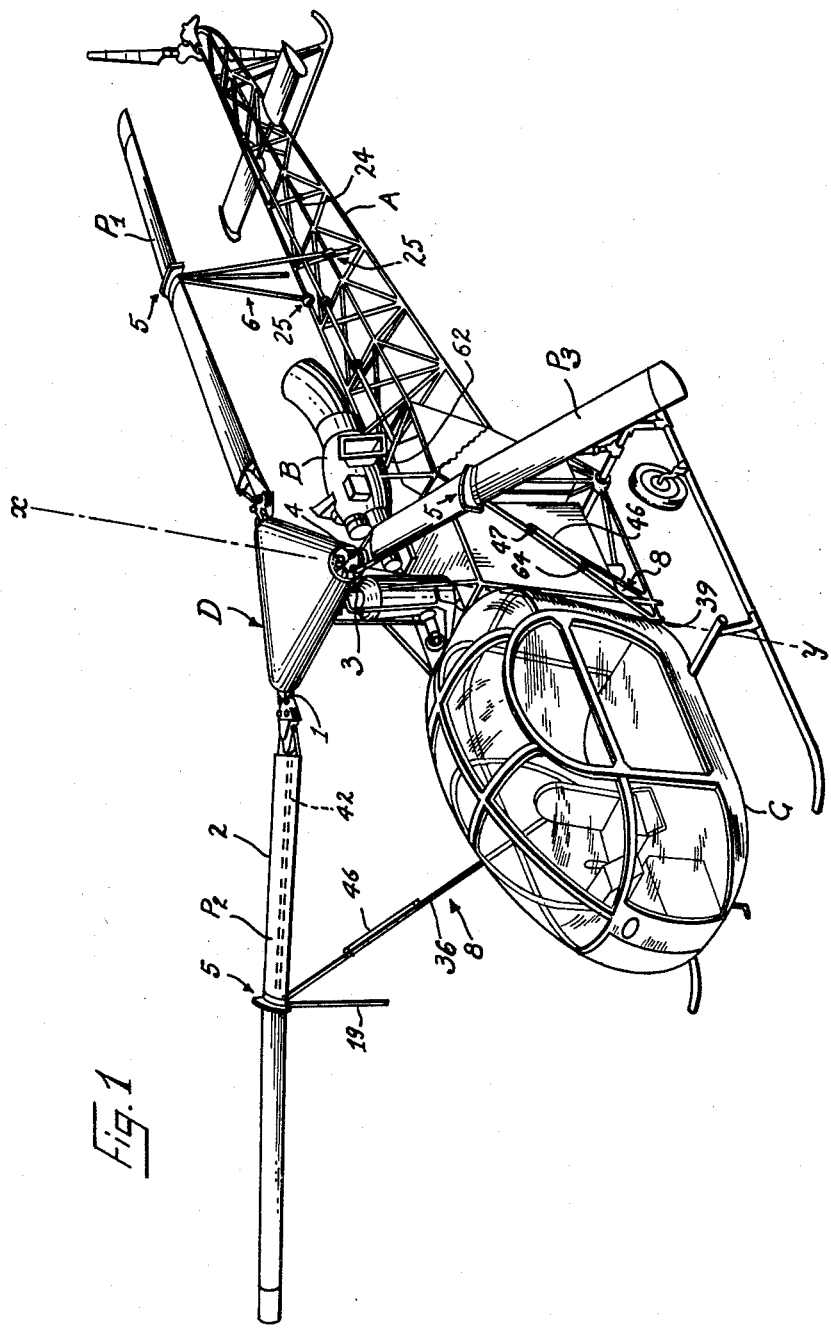
FIGURE 1 is a view of a helicopter equipped with an apparatus according to the invention, before folding.
Figure 2:
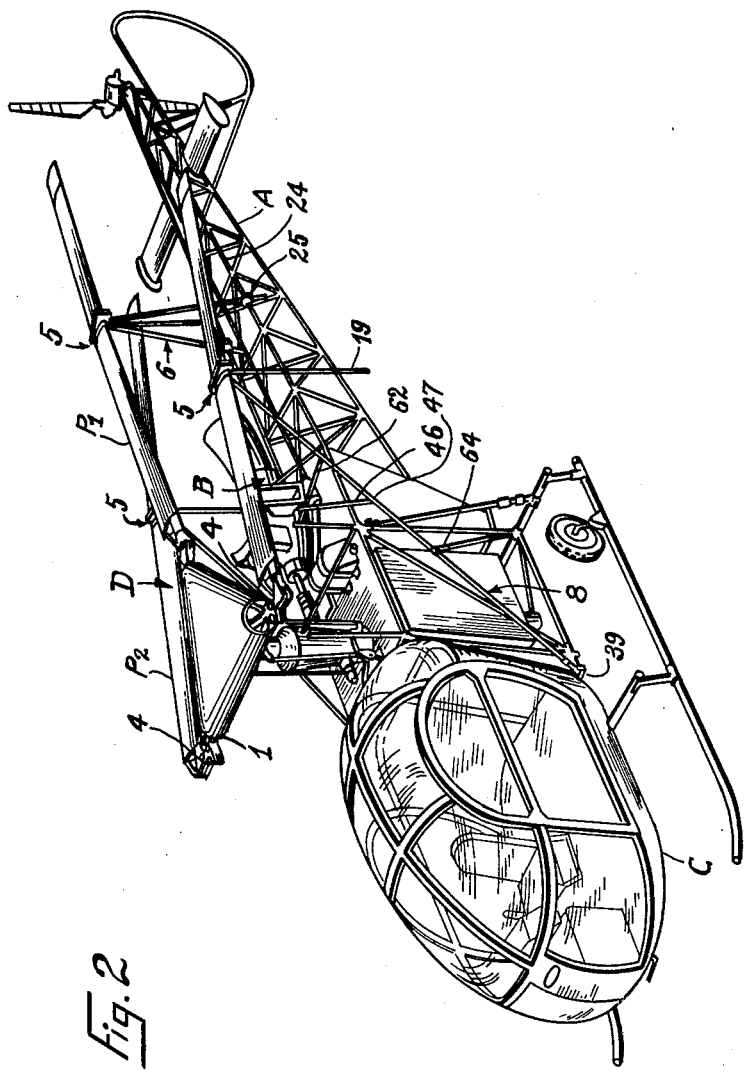
FIGURE 2 is a similar view of this same helicopter with the blades folded back.
Figure 3:
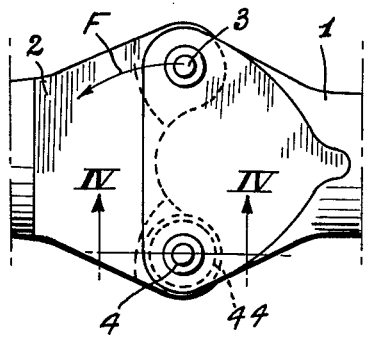
FIGURE 3 is a diagrammatic plan view of the connection of a hub arm to a blade root.
Figure 4:
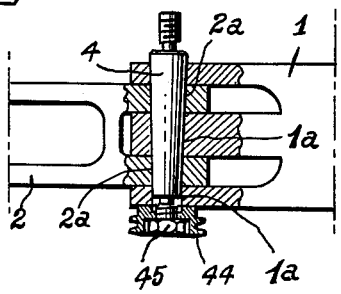
FIGURE 4 is a sectional view taken on IV—IV of FIGURE 3.

The helicopter shown in FIGURES 1 and 2 comprises a fuselage A constituted by a lattice girder which supports the engine B and is connected to the cabin C. The engine drives a three-blade rotor D each hub arm 1 of which is connected to a blade 2 (FIGURES 3 and 4) by an inter-fitting arrangement of flanges which is immobilised by two conical pins 3 and 4 fitted into coinciding apertures 1a and 2a respectively belonging to the hub flanges and the blade root flanges. Consequently, if the pin 3 is removed, the blade root can pivot, as indicated by the arrow F in FIGURE 3, about the pin 4 which has been left in position.

In the case of the helicopter illustrated here, this feature is used to fold the blades so as to reduce the bulk of the helicopter when the latter is not in flight. Two of the blades $P_2$ and $P_3$ are folded almost parallel to the third $P_1$ and the whole assembly is arranged in the direction of the fuselage (see FIGURE 2), the blades being held and supported in this condition.

In order to ensure that during the folding operation and then in the unfolding operation which becomes necessary in order to put the aircraft back into a state ready for flying, the blades, the hub and the controls are not subjected to abnormal stresses, it is convenient for folding and unfolding to be carried out in a constant known position of the rotor, for example by placing and immobilising the stick in the position corresponding to maximum elevating and putting the pitch lever to the smallest pitch, practically nil.

The blade $P_1$ being directed parallel to the direction of the fuselage A, this blade is gripped by a clip which is given the general reference numeral 5 and immobilised relatively to the fuselage A by means of a support 6. The two other blades $P_2$ and $P_3$ are also each engaged by a clip 5 and the supports designated with the general reference numeral 8 support these blades during their pivoting and then enable them to be immobilised against the fuselage A.

A clip 5 (see also FIGURES 5 and 8) is constituted by a lower jaw 9 and an upper jaw 10 the former of which matches the form of the lower surface of the blade and the upper jaw the form of the upper surface of the blade, each of these jaws being constituted by a U-section (9a, 10a respectively) supporting a curved sheet metal member (9b, 10b) which, in order not to damage the blade, is covered with a layer of felt or foam rubber (9c, 10c).

The two jaws are articulated on one another at a pin 11 near the leading edge of the blade in such a manner that in order to grip the said blade the said jaws open like a duck's beak. They are urged in the opening sense by a spring 12 which is attached to the outer portions of pins 13 and 14 which extend through the lowest portions of the two jaws 9 and 10. Articulated on the pins 13 and 14 are respectively the links 15 and 16 which are connected together by the pin 17.

The pin 17 is connected by means of the short wrist-pin 18 and a pin 18a perpendicular to the pin 17, to a pull rod 19. This connection, therefore, behaves like a universal joint which gives a certain liberty to the pulling force exerted on the pull rod. The clip is carried by the blade supports (that which is shown in FIGURE 6 in the case of the rear blade or that shown in FIGURE 8 for the lateral blades) by means of a pivot pin 20.

Figure 5:
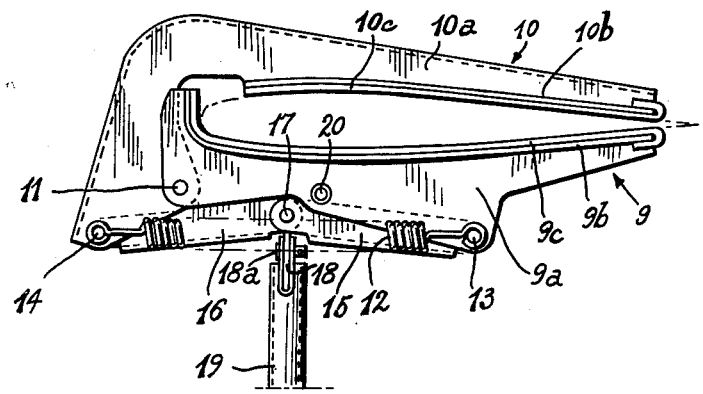
FIGURE 5 is an elevational view of a clip which is intended to grip a blade.

The clip which has just been described operates in the following manner:

In the position illustrated in FIGURE 5, the pin 17 having gone beyond the alignment determined by the pins 13 and 14, the preload of the spring 12 cannot cause the opening of the clip and the said clip holds the blade without, however, being able to crush it, since the length of the links 15 and 16 limits the closing travel of the jaws.

If the pull rod 19 is subjected to a tractive force, the pin 17 passes to the other side of the alignment of the axes 13 and 14 and the spring 12 is relaxed, which permits the jaw 10 to lift in order to disengage the blades. The lower jaw 9 pivoting about the pin 20 then completely releases this blade.

In the case of the blade $P_1$ in FIGURE 6, the pin 20 is carried by two uprights 21 and 22 which are pivotably connected to one another in the form of an inverted V; in order to simplify construction and to permit of folding, the upright 22 is not directly articulated to the pin 20 but is mounted on a pin 23 near the latter. The uprights 21 and 22 are fixed on the tubes 24 forming part of the fuselage A by means of hook-on devices 25 which can be operated by means of levers 26, these devices being shown in detail in FIGURE 7.

Each of them comprises, within a casing formed of a metal sheet 28 bent to the form of a U, two noses 29 each comprising an arcuate recess 29a the radius of which is equal to that of the tubes 24; these noses are each pivotably mounted on a pin 30, the two pins 30 being diametrally opposite relatively to the tube 24 when the hook-on device is in position.

Bearing on the outer parts of the noses 29, beyond the pins 30, are the limbs 31a of two coil springs 31 which are fitted on to the pins 32. The two other limbs 31b of these springs are engaged in the notches 33a of a bolt member 33 which slides between the two guides 34 fixed in the casing. The bolt member 33 comprises a slot 33b and a drilling 33c whereby a cross-member 35 can be fixed on which the end of the lever 26 acts.

This hook-on device operates in the following manner:

The two limbs of each of the coil springs 31 tend to approach one another, and the limb 31a tends to bring the noses 29 into the position $29_1$ shown in dotted line ($29_1$) in FIGURE 7, whereas the limb 31b tends to repel the bolt member 33 towards the left (position $33_1$). In this position it is possible to engage the noses 29 on one of the tubes 24, and when the device is pressed on to this tube the noses close, the bolt member 33 is displaced towards the right in this figure under the action of the heel of the noses 29 until the said noses close, and then return resiliently to lock them as illustrated between the rear ends of these two noses.

Conversely, in order to withdraw the limbs the lever 26 is acted upon and this pulls the bolt member 33, the noses open and as the supports 21 and 22 each carry a bolt member of this kind, they are immediately released from the tubes 24.

In the case of each of the blades $P_2$ and $P_3$, in the example illustrated in FIGURES 1, 2 and 8 each of the supports 8 which support a blade pivots at its lower portion at a point situated in alignment with the axis $x$—$y$ of the pin 4 serving as a hinge pin. Thus, in the blade folding movement, the triangle constituted by the blade, its support and the geometric straight line $x$—$y$ remains indeformable and is displaced with a rotational movement about this axis $x$—$y$ which acts as a hinge axis.

The support 8 (FIGURE 8) is constituted essentially by a tubular strut 36 which at its base carries a ball socket 37. The cup 37a of this socket engages on the ball head 38 which is mounted on the support 39 which is fixed on the tube 40 of the basic fuselage A. The cup 37a is held in position by the pin 41 which is engaged in the lateral recess 37b of the ball socket 37. The pin 41, provided with an operating handle 41a, comprises a flat portion 41b which, suitably orientated, permits the entry of the ball head 38 into the cup, whilst when the pin 41 is left to itself it folds back to dispose the flat portion 41b in an oblique position, which prevents the spontaneous release of the socket from the ball head.

At the other end, the strut 36 supports the pin 20 which itself carries a clip 5. However, owing to the weight and the oblique position of the strut 36, the clip 5 is capable of sliding towards the end of the blade on which it bears, since it has been indicated that this clip matches the form of the blade without clamping it tightly.

In order to overcome this disadvantage, the upper portion of the strut is connected to the pin 4 by means of a cable 42 whose shackle 42a is engaged on the pin 43 of the clip support and the loop 42b on a small pulley 44 (see FIGURE 4) which is held in position co-axially with the pin 4 by the nut 45 screwed on to the end of the said pin.

After the strut and the blade have been folded against the fuselage, the said strut is fixed to the fuselage by the post 46. This post is attached to the said strut by a collar 47, which supports a pin 48 extending through the universal joint shoe 49 on which the end strap of the post 46 is pivotably connected by means of the pin 50 (see also FIGURE 10).

At its other end, the post 46 terminates in a clip whose two jaws 51 and 52 pivotably connected about the pin 53, each terminate in a half-cup 54. The jaw 51 is provided with a screwthreaded shank 51a which permits its fixing in the sleeve 58 co-axially with the post by means of the nut 55.

Slidable on the two limbs of the clip is the sleeve 56 urged by the spring 57 which bears on the one hand on the said sleeve 58 and on the other hand on an internal shoulder of the sleeve 56. The travel of this sleeve towards the cups 54 is limited by the circular groove 59 each of whose halves forms an integral part of a jaw 51 or 52. The cups 54 are intended to grip a ball head 60 carried by a collar 61 which is fixed on a tube 62 of the fuselage (see also FIGURE 1).

When the strut is not in service, the post 46 can be folded along the strut as FIGURE 1 shows, the cups 54 engaging with the ball head 63 which is fixed to the strut 36 by means of a collar 64 similar to the collar 61 but of greater diameter than the latter.

When the helicopter is in the condition shown in FIGURE 2, after the posts 46 have been released by the operation of the sleeves 56, the blades $P_1$ and $P_2$ are brought to the normal position, after which the clips 5 are opened and, by operating the pin 41, the struts are released from the ball head 38, the support 39 nevertheless remaining fixed to the machine. The cable 42 falls, disengaging itself from the pulley 44. The assembly is completed by the re-positioning of the pins 3.

However, it may happen that it is not possible to arrange at a sufficient distance from the pin 4 the ball head 38 which permits the folding movement of the blade, the rotational movement of the blade passing over a plane perpendicular to the pin 4. Indeed, the geometric straight line $x$—$y$ may meet the cabin at a small distance from the pin 4.

FIGURE 11 shows diagrammatically how this difficulty may be solved by using a strut of variable length bearing on a pivot point externally of the axis $x$—$y$.

In this figure, S designates the circle which the clip 5 carrying a blade such as $P_1$ or $P_2$ is to describe about the axis $x$—$y$ which is represented by the pin 4 and on which the ball head 38 is to be positioned, in a spaced relationship.

If $S_1$ and $S_2$ are the end positions of the clip 5 in its folding movement and $S_3$ the centre of the arc $s_1$—$s_2$, the pivot point M of the strut T supporting the clip 5 is selected in the plane $S_3$ $x$—$y$, which determines the shortest length of this strut. Indeed, on either side of the position $S_3$M, for example at $T_1$, the strut is to be longer in order to hold the clip 5 on the circle S and its length is to increase progressively up to the end positions $S_1$ and $S_2$.

On the plane V extending through M and perpendicular to the axis $x$—$y$, the strut in its shortest situation projects at $t$. Then with M as the centre, a circle R is drawn and a fixed point W is chosen on the straight line $t$.

If it is then arranged that there corresponds to the position T (position where the strut is shortest) the length MWV (W being the point at which the straight line T meets the circle R), there will correspond to the position $T_1$ of the strut the length $MW_1V$, i.e. that of the two sides of the triangle whose base is MV and whose apex describes the circle R; it will be apparent that this sum of the lengths of the two sides of the triangle increases in the same sense as the length of the strut when the end of said strut goes from $S_3$ either towards $S_2$ or towards $S_1$. Furthermore, since the radius of the circle R and the position of the point V are arbitrary, it is possible to choose the radius $r$ of the circle R and the distance $d$ between the point V and the point M so that the variation in length of the strut is constantly at least substantially equal to the sum of the two sides of the variable triangle $MW_1V$.

FIGURES 12 and 13 show an arrangement which makes it possible for the length of a strut to be constrainedly varied at each instant by a quantity equal to the variation in the sum of the lengths of the two sides of the triangle whose base is MV and whose apex describes the circle R, so that the clip 5 and consequently the blade describe a plane perpendicular to the axis $x$—$y$, which prevents the twisting of the pin 4 and also of the blade.

In FIGURES 12 and 13, the strut is constituted by a tube 71 sliding in a tube 70. The latter has extending therethrough a pin 72 which can be displaced longitudinally in the oppositely facing slots 71a of the tube 71. At its upper end, the tube 71 carries by means of a strap 73 a pulley 74, and at its other end the tube 71 also carries a strap 75 which extends over the mounting strap 76 of a pulley 77, the two straps and the pulley being traversed by the common pin 78.

The strap 76 is fast with an arm 79 formed of two superposed and braced plates, the said arm carrying towards its free end the two tangent pulleys 80.

The strap 76 and its arm 79 are carried by a pivot engaged in a support 82 whose extension 82a supports the pin 85 (corresponding to the point V) fixing the cable 83 which passes between the pulleys 80 and over the other pulleys which have just been described to be attached at its other end to the pin 72.

Each support 82 is provided with a dovetail stud which can fit into the fitting 84 which is fixed to a suitable point on the helicopter, that is to say on the cabin or on the fuselage at a point as near as possible to an axis $x$—$y$.

In this embodiment, the extension 82a of the arm is orientated in the direction $Mt$, i.e. in the median plane of the arc described by the blade, being supported by the strut 70, 71 corresponding to T. When the arm 79 is directed in the same direction, the cable 83 is straight between the point of attachment V and the pulley 77. The pin 72 descends to the maximum extent in the slots 71a and the strut T is at its minimum length. On either side of this position, the arm 79 whose pulleys 80 describe the circle R extends in the form of a triangle, the portion of the cable comprised between the attachment point V and the pulley 77 corresponding to the point M and consequently causes the re-ascent, by means of the pulley 74, of the tube 70 on the tube 71, thus extending the length of the strut. Otherwise, the arrangement of the upper part of the strut 70, 71 and the arrangement of the post may be identical to what has already been described hereinbefore.

The embodiment shown in FIGURES 11 and 13, which is a relatively complicated construction, is necessary when the pivot of the support is fairly far from the rectilinear prolongation $x$—$y$, whereas if it can be positioned fairly near to this prolongation the simpler support shown in FIGURES 14 to 16 can be used, this support comprising a telescopic strut containing internally a spring acting in the sense of lengthening the said strut.

The telescopic strut is constructed in two parts to reduce its bulk and to permit or facilitate its being carried on board the helicopter. The connection of the two parts to one another substantially centrally of the total length of the strut is effected by means of a rapid-connecting and rapid-disconnecting device.

The two parts A' and B' shown in FIGURES 14 and 15 fit into one another; in the position of use, A' is the lower part and B' the upper part.

The part A' comprises two tubes 113 and 114 which are screwed on to one another and are rendered fast in rotation with one another by a screw 115. This part A' also comprises a tube 101 which slides within the tubes 113 and 114 and which is urged externally by the restoring spring 103.

The tube 101 comprises terminally a fixed-on socket 104 and is formed with an oblique hole 105 serving as a housing to receive the ball head fixed on the fuselage. The locking key 41 engaging in the hole 106 holds the strut in position without hindering rotation.

The tube 101 slides within the tube 113, being guided by two bearing parts, one of these parts 107 forming a piston and being rendered fast with the tube 101 by a pin 108, mounted at its ends of flats formed by grooves 109 in the piston 107, the other 110 being fast with the tubes 113 and 114.

The end of the tube 101 sliding in the bearing part 110 encloses a cylindrical sheath 111 held by rivets, the assembly of tube and sheath comprising a rectangular-section slot 112 arranged along one generatrix.

The screw 115 which prevents the tubes 113 and 114 from rotating relatively to one another simultaneously holds in position the bearing part 110 and prevents the rotation of the rod 101, penetrating by its end into the slot 112.

Opposite from its junction with the tube 114, the tube 113 terminates in a nut 116 which is screwed and glued thereto, and withstanding the reaction of the spring 103 by means of a ring 117 and a packing 118 glued to this ring, the other abutment of the spring 103 being constituted by the bearing part 110.

The tube 114 terminates in an end piece 119 which is fixed by screwing and gluing; this end piece is provided with a conical bore and with a slot along one generatrix, likewise the end of the tube. In the end piece 119, this slot 120 has a rectangular cross-section (FIGURE 16).

The part B' (FIGURE 15) comprises three elements: a sleeve 121 rivetted on a tube 122, which itself is rivetted to a third tubular element 123.

The sleeve 121 terminates in the pin 20 serving as an articulation for the collar constituting the blade support 10.

The tubular element 123 is used for the assembly of the units A' and B' to one another. For this purpose the end piece 119 of the tube 114 fits co-axially on the inner frusto-conical pin 124, whilst the said tube 114 is engaged in the bore of a rubber sleeve 125 held between a shoulder of the tube 123 and a ring 126 on which bear the cam-shaped ends of two paired levers 127 articulated to the end of the part 123.

In order to permit the axial compression of the sleeve 125, the latter comprises circular peripheral grooves 125a connected to one another by a groove (not shown) directed along one generatrix in order to ensure that the grooves 125a communicate with the free atmosphere.

The pin 128 prevents the rotation of the part A' within the part B', engaging in the groove 120, which ensures angular position coincidence of the axes of the hole 105 and pin 20.

In order to connect the parts A' and B' to one another, it is sufficient to fit the tube 114 into the part 123, the lever 127 being in the position shown in the drawings, the sleeve 125 is then relieved of load, the pin 128 engages in the slot 120 and then the part A' is pushed until the end piece 119 abuts on the part 124 with the centering effect effected by the cones. The assembly is locked by rocking the lever 127 into the position shown in dot-dash lines. The sleeve 125 is crushed and prevents any play in its bearing part, whilst immobilising the part A' in the part B'.

The strut thus assembled is positioned by first of all mounting the blade support 10 on the pin 20, then lifting the blade and compressing the spring 103 to engage the end piece 104 on the ball head 38.

I claim:

1. Apparatus for supporting and holding folding blades of helicopters, comprising a blade-carrying clip for each blade, each clip having a lower jaw engaging below the blade and an upper jaw which presses the said blade against the lower jaw, a support for each clip bearing on the helicopter fuselage to transmit thereto the weight of the blade, all except one at most of these supports being pivotable about their points of attachment on the fuselage, whilst the blades themselves are pivotally connected to the blade hub.

2. Apparatus according to claim 1, comprising a resilient device for urging each clip in the opening sense, a locking device for holding said resilient device closed, and a pull member for releasing said locking device.

3. Apparatus according to claim 1, comprising a resilient device for urging each clip in the opening sense, a locking device for holding said resilient device closed, and a pull member for releasing said locking device, said locking device comprising a toggle lever system formed of two links articulated to one another and respectively to each of the jaws, the locked position being obtained by moving upwardly out of alignment with the said lever system, so that the release of the locking device is obtained by a pulling force directed downwardly on the articulation between the two links.

4. Apparatus according to claim 1, wherein the point of articulation to the fuselage of the support of a folding blade is situated on the extension of the geometric axis of articulation of the blade to its hub.

5. Apparatus according to claim 1, wherein the support of a folding blade is constituted by a strut comprising at one end the clip for gripping the blade and at the other end the articulation at which the said strut bears on the fuselage.

6. Apparatus according to claim 1, wherein the support of a folding blade is constituted by a strut comprising at one end the clip for gripping the blade and at the other end the articulation at which the said strut bears on the fuselage, the upper portion of the said strut being connected to the hub by a cable.

7. Apparatus according to claim 1, wherein the support of a holding blade is constituted by a strut comprising at one end the clip for gripping the blade and at the other end the articulation at which the said strut bears on the fuselage, the said strut, in the folded position of the blade, being immobilised by a post attached on the one hand to the said strut by a universal joint and on the other hand to the helicopter fuselage by a rapid-release attachment.

8. Apparatus according to claim 1, wherein the support of a folding blade is constituted by a strut comprising at one end the clip for gripping the blade and at the other end the articulation at which the said strut bears on the fuselage, the said strut, in the folded position of the blade, being immobilised by a post attached on the one hand to the said strut by a universal joint and on the other hand to the helicopter fuselage by a rapid-release attachment formed of two-cup-shaped jaws capable of gripping a ball head and held closed by a sleeve which surrounds them and which is loaded by a spring.

9. Apparatus according to claim 1, wherein one of the clips is carried at the end of a support in the form of an inverted V constituted by two limbs pivotally connected to one another, the said limbs having their two other ends fixed on either side of the helicopter fuselage.

10. Apparatus according to claim 1, wherein one of the clips is carried at the end of a support in the form of an inverted V constituted by two limbs pivotally connected to one another, the said limbs having their two other ends fixed on either side of the helicopter fuselage, the fixing of the V-shaped support to the fuselage being effected by a locking device having two noses pivotally mounted on two opposite pins and each urged in the opening sense by the end of a torsion spring, the other end of this torsion spring pushing between the rear portions a bolt member which prevents the opening of these noses.

11. Apparatus according to claim 1, wherein a point at which a blade support pivots on the helicopter fuselage is externally of the extension of the axis at which the blade is articulated to the hub, and the said support is a strut of variable length, the minimum length of the said strut being obtained in the plane extending through the said extension and the point of articulation of the said strut to the fuselage.

12. Apparatus according to claim 1, wherein a point at which a blade support pivots on the helicopter fuselage is externally of the extension of the axis at which the blade is articulated to the hub, and the said support is a strut of variable length, the minimum length of the said strut being obtained in the plane extending through the said extension and the point of articulation of the said strut to the fuselage, the said strut being constituted by two elements sliding longitudinally with respect to one another, the length being regulated by means of a cable attached to the upper element and passing over two guide pulleys situated respectively at the ends of the lower element, the said articulation being fast with an arm rotating with the strut, the said arm displacing transversely the run of the cable issuing from the said lower pulley to be attached to a fixed point situated in the plane containing the extension of the axis of articulation of the blade and the point of articulation of the strut.

13. Apparatus according to claim 1, wherein a point at which a blade support pivots on the helicopter fuselage is externally of the extension of the axis at which the blade is articulated to the hub, and the said support is a strut of variable length, the minimum length of the said strut being obtained in the plane extending through the said extension and the point of articulation of the said strut to the fuselage, the variable-length strut being constituted by two tubular elements sliding in one another, and an interposed spring acting in the sense of lengthening the strut.

14. Apparatus according to claim 1, wherein a point at which a blade support pivots on the helicopter fuselage is externally of the extension of the axis at which the blade is articulated to the hub, and the said support is a strut of variable length, the minimum length of the said strut being obtained in the plane extending through the said extension and the point of articulation of the said strut to the fuselage, the variable-length strut being constituted by two tubular elements sliding in one another, and an interposed spring acting in the sense of lengthening the strut, the variable-length strut being in two parts of substantially equal length, only one of the two parts being of variable length.

15. Apparatus according to claim 1, wherein a point at which a blade support pivots on the helicopter fuselage is externally of the extension of the axis at which the blade is articulated to the hub, and the said support is a strut of variable length, the minimum length of the said strut being obtained in the plane extending through the said extension and the point of articulation of the said strut to the fuselage, the variable-length strut being constituted by two tubular elements sliding in one another, and an interposed spring acting in the sense of lengthening the strut, the variable-length strut being in two parts of substantially equal length, only one of the two parts being of variable length, and the two parts of the strut fitting into one another and the end of the inner part being centered in the outer part by a conical interfitting arrangement whilst the end of the outer part is provided with a resilient sleeve which, by axial compression, grips the inner part.

References Cited in the file of this patent

UNITED STATES PATENTS

| | | |
|---|---|---|
| 2,110,443 | Larsen | Mar. 8, 1938 |
| 2,549,886 | Buivid | Apr. 24, 1951 |